United States Patent
Dwyer et al.

(10) Patent No.: US 8,239,972 B2
(45) Date of Patent: Aug. 14, 2012

(54) SYSTEM AND METHOD FOR IMPROVING JET AIRCRAFT OPERATING EFFICIENCY

(75) Inventors: Michael D. Dwyer, Seminole, FL (US); Richard F. Wessels, Dunedin, FL (US); David R. Hollingsworth, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 1351 days.

(21) Appl. No.: 12/019,185

(22) Filed: Jan. 24, 2008

(65) Prior Publication Data

US 2009/0188031 A1    Jul. 30, 2009

(51) Int. Cl.
*A47K 11/02* (2006.01)

(52) U.S. Cl. ............................. 4/111.4; 4/321

(58) Field of Classification Search ........... 4/316, 111.1, 4/111.4, 111.6, 321
See application file for complete search history.

(56) References Cited

U.S. PATENT DOCUMENTS

| | | | |
|---|---|---|---|
| 2,565,720 A * | 8/1951 | Collison et al. ................ | 4/111.1 |
| 2,677,234 A * | 5/1954 | Campbell ....................... | 60/781 |
| 3,936,888 A * | 2/1976 | Sturtevant ...................... | 210/173 |
| 4,202,061 A | 5/1980 | Waters | |
| 4,809,934 A * | 3/1989 | Rix ............................ | 244/135 R |
| 5,305,792 A * | 4/1994 | Ellgoth et al. ............. | 137/899.2 |
| 5,655,732 A | 8/1997 | Frank | |
| 6,745,407 B1 | 6/2004 | Van Acker, Jr. | |
| 6,823,831 B2 * | 11/2004 | Chu et al. ................. | 123/198 D |

FOREIGN PATENT DOCUMENTS

| | | |
|---|---|---|
| AU | 421369 | 3/1972 |
| WO | 98/12107 A1 | 3/1998 |

OTHER PUBLICATIONS

EP Communication; EP 09150886.1-2422/2082959 dated Sep. 11, 2011.

* cited by examiner

*Primary Examiner* — Huyen Le
(74) *Attorney, Agent, or Firm* — Ingrassia Fisher & Lorenz, P.C.

(57) ABSTRACT

A disposal system is provided. In an embodiment, by way of example, the disposal system can include a first tank adapted to be at least partially filled with waste fluid. The disposal system can also include a waste processing device adapted to receive waste fluid and adjust one or more properties of the waste fluid. Additionally, the waste disposal system can include a jet engine comprising a first chamber adapted to contain a fluid undergoing compression. The jet engine can be in fluid communication with the waste processing device to receive the waste fluid from the waste processing device.

10 Claims, 3 Drawing Sheets

SYSTEM AND METHOD FOR IMPROVING JET AIRCRAFT OPERATING EFFICIENCY

TECHNICAL FIELD

The inventive subject matter generally relates to aircraft engine operation, and more particularly relates to injection of waste fluid to jet engines.

BACKGROUND

The cost of aircraft operation depends in part on the fuel efficiency of the aircraft. A heavy aircraft requires more thrust and correspondingly consumes more fuel than a light aircraft. During the slowing phase of the landing of a flight, an aircraft will sometimes reverse the thrust direction of its engines to reduce its speed. Additionally, a braking system can be used to reduce speed of rotation of the landing gear assemblies. By reducing weight while slowing, less fuel can be consumed while reversing thrust, and wear and heat produced by braking can also be lessened. Thus, by reducing the weight of aircraft during any phase of flight, the cost to operate the aircraft can be reduced.

Typically, aircraft carry water aboard in a variety of locations and for different uses. As one example, aircraft carry potable water in storage tanks for consumption by passengers during the flight, either directly or through combination with other items as part of a meal. As another example, water is usually at least part of a fluid used to operate on-board toilets in the lavatory of the aircraft. Additionally, potable or non-potable water can be provided to wash basins in the lavatories. After use in the lavatory, the waste from the toilet or wash basin is usually stored in a separate waste tank until the aircraft has landed. The waste tank is then emptied prior to the next flight. Similarly, the water storage tanks are refilled after each flight. As a result, the aircraft carries hundreds of gallons and thousands of pounds in water and waste during the liftoff, cruise, and landing phases of each flight. Accordingly, part of the fuel used on each flight is to transport the water and waste tanks.

Water can also collect in fuel tanks of an aircraft, as condensation on the walls of less than fully-filled fuel tanks. Because water has a higher density than typical jet fuel, such as Jet A or Jet A-1, the water tends to sink in the fuel tank to a sump located near the bottom of the tank. During normal operation, scavenge pumps operate to remove the water from the fuel tanks, and store it as waste until the aircraft has landed and the waste tanks are emptied. The waste water from the fuel tanks creates additional weight, further increasing the cost of fuel to operate the aircraft on each flight.

BRIEF SUMMARY

A disposal system is provided. The disposal system can include, in one exemplary embodiment, a first tank adapted to be at least partially filled with waste fluid, a waste processing device in fluid communication with the first tank to receive the waste fluid and adjust one or more properties of the waste fluid, a jet engine comprising a first chamber adapted to contain a fluid undergoing compression, the jet engine in fluid communication with the waste processing device to receive the waste fluid from the waste processing device.

In some embodiments, the first chamber comprises a compression chamber of the jet engine. In some embodiments, the first chamber comprises the final compression chamber of the jet engine. In certain embodiments, the first chamber comprises a portion of a turbine in the jet engine. In some embodiments, the disposal system further comprises a second tank adapted to be watertight, the second tank at least partially filled with potable water and in fluid communication with the waste processing device. In some embodiments, the waste fluid comprises waste liquid from a galley, a lavatory, or a fuel tank scavenge pump.

In some embodiments, the first tank is in fluid communication with a basin in a lavatory. In certain embodiments, the first tank is in fluid communication with a basin in a galley. In some embodiments, the disposal system further comprises a fuel tank scavenge pump in fluid communication with the waste processing device or the jet engine. The disposal system can further comprise a control system adapted to adjust the fluid flow through the second conduit.

A method of disposing of waste is provided. In an embodiment, by way of example, the method comprises the steps of collecting waste, adjusting one or more properties of the waste to produce processed waste and providing at least part of the processed waste to a chamber of a jet engine. In some embodiments, the method further comprises providing at least part of the waste to a compression chamber of a jet engine. In some embodiments, adjusting the properties of the waste comprises producing a substantially-inform fluid. In certain embodiments, adjusting the properties of the water comprises adding fluids to the waste. In some embodiments, adjusting the properties of the water comprises contact processing of the waste. In some embodiments, the adjusting the waste comprises providing potable water to the waste.

An aircraft fluid disposal system is provided. In an embodiment, the disposal system comprises a first storage tank adapted to be at least partially filled with a substance, a second storage tank adapted to be at least partially filled with water, a fluid intake adapted to receive waste from at least one basin, a waste processing apparatus in fluid communication with the first storage tank and adapted to adjust one or more properties of the substance to produce a fluid, a jet engine, and a conduit architecture adapted to place at least one of the first storage tank, second storage tank, and fluid intake in fluid communication with the waste processing apparatus and to place the waste processing apparatus in fluid communication with the jet engine.

In some embodiments, the first storage tank is adapted to receive waste from a lavatory. In certain embodiments, the second storage tank is adapted to provide potable water to at least one of a lavatory, a galley, and a water dispenser. In some embodiments, the basin is disposed in at least one of a lavatory and a galley.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter.

Furthermore, there is no intention to be bound by any theory presented in the preceding background or the following detailed description.

Figure 1:
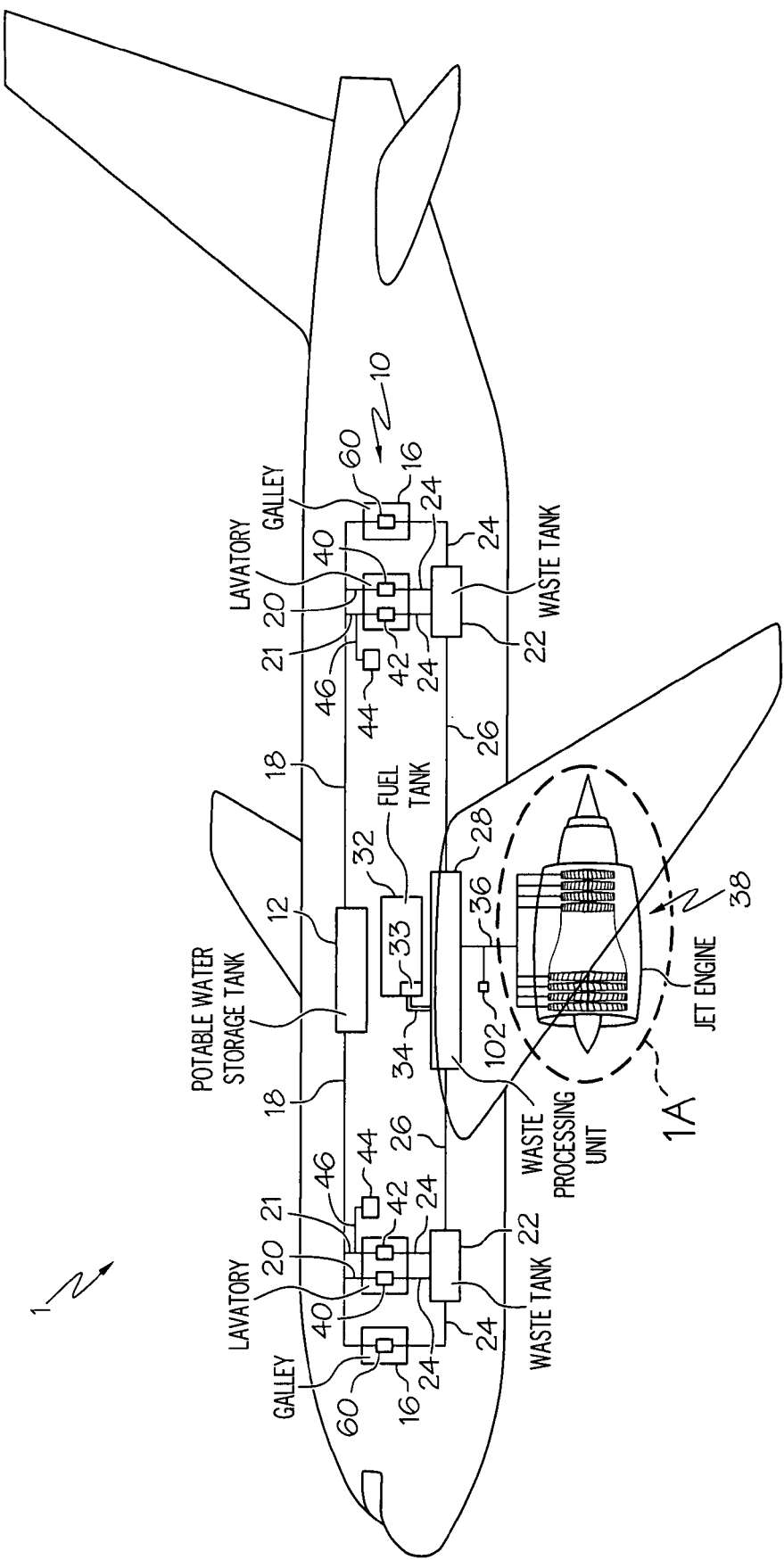
FIG. 1 is an embodiment of an aircraft having a waste disposal system.
Figure 1A:
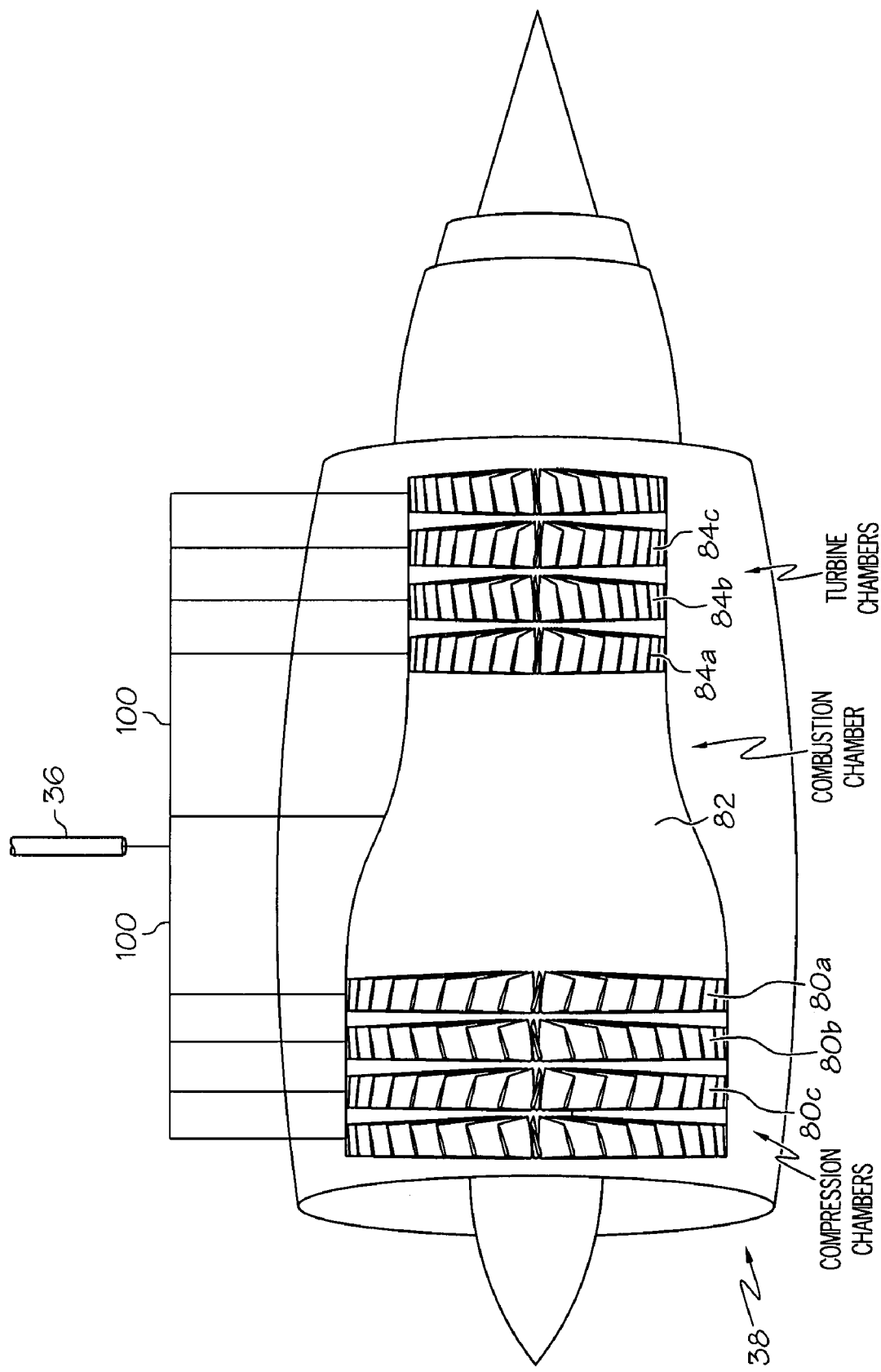
FIG. 1A is a detailed view of a portion of the embodiment of FIG. 1.

FIG. 1 illustrates an aircraft 1 having a number of features and components including, without limitation: a potable water storage tank 12; one or more lavatories 14; one or more galleys 16; one or more waste storage tanks 22; one or more jet engines 38; and one or more fuel tanks 32; some or all of which can separately form a waste disposal system 10.

During normal operation, the aircraft 1 uses thrust from jet engines 38 to accelerate on the ground until achieving take-off velocity. The aircraft 1 then ascends using lift from the wings to reach a cruising altitude and speed, with continued thrust from the jet engines 38. When near its intended destination, the aircraft 1 descends and slows in preparation for landing. When nearing the ground for actual landing, the speed of the aircraft 38 is preferably reduced to allow touchdown to occur at as slow a speed as possible. In order to maintain flight prior to touchdown, however, the aircraft 1 must fly at a speed greater than the stall speed. The stall speed for the aircraft is that at which the wings fail to produce sufficient lift to keep the aircraft in flight. Various factors affect the stall speed, such as the pitch of the aircraft 1, weight of the aircraft 1, degree of deployment of wing flaps and overall cross-sectional geometry of the wings, wind conditions, temperature, and so on. It is preferable to lower the stall speed of the aircraft 1 prior to landing for numerous reasons, including, but not limited to, lessening of impact during touchdown, reduction of brake wear while braking after touchdown, lower fuel consumption, and a general reduction in kinetic energy of the aircraft 1 while landing.

Aircraft typically carry potable water in a potable water storage tank 12 for use during flights. One use of the water is distribution among occupants for consumption. Other uses of potable water can include food preparation in a galley 16, washing basins in the lavatory 14 or galley 16, or sanitary uses in the lavatory 14. For sanitary uses in the lavatory 14, disinfecting agents can be added to the water before introduction to the lavatory 14. Waste water from the lavatory 14 and galley 16 are typically collected in a waste storage tank 22 for disposal after landing and termination of the aircraft's flight.

The aircraft 1 can also have at least one fuel tank 32. The aircraft 1 can have one fuel tank 32 or multiple tanks distributed as appropriate throughout the airframe to supply the aircraft engine and other aircraft systems as needed. The fuel tank 32 can be composed of metal and can be watertight to inhibit leaks. During flight, water can condense on the inner walls of the fuel tank 32. As the water condenses, it can eventually fall into the remaining fuel in the tank. The fuel within the tank can have a density lighter than water, causing the water to sink in the tank. The fuel tank can have a sump to accommodate the water. Additionally, fuel tanks can have one or more scavenge pumps 33. A scavenge pump 33 can operate continuously or intermittently to remove water from the sump. Such water can also be placed in a waste storage tank for removal post-flight.

Reduction of the weight of the aircraft 1 during cruising can reduce fuel consumption over the course of the flight. Additionally, weight reduction can lower the stall speed during landing, thereby lessening equipment stress and wear. To achieve either or both these benefits, some or all of the potable water and scavenge-pumped water can be used to provide thrust for the aircraft 1, which additionally increases jet engine thrust. As a consequence of the increased thrust, cruising speed can be increased. Alternatively, if fuel input is decreased to maintain a constant level of thrust when water or other fluids are injected, the aircraft can consume less fuel during its flight. FIG. 1 illustrates an aircraft 1 having an integrated waste disposal system 10 for use in disposing of at least some water and waste during operation of the aircraft 1, rather than post-flight. The waste disposal system 10 can collect waste from the lavatories 14 and galleys 16 aboard the aircraft 1 and process the waste in a waste processing device 28. Potable water from the aircraft's potable water storage tank 12 can also be provided to the waste processing device 28. Similarly, water from the scavenge pumps 33 in the aircraft's fuel tanks 32 can provide water to the waste processing device 28. After processing, the waste and/or water can be provided to a jet engine (or engines) 38 of the aircraft for improved engine performance and reduced aircraft weight. Accordingly, the weight of the aircraft during cruising and prior to landing can be reduced, concurrently reducing the required fuel and lowering the stall speed of the aircraft during landing.

The waste disposal system 10 can include or cooperate with any of the components of the aircraft, including a potable water storage tank 12. The potable water storage tank 12 can be of any appropriate size for use on an aircraft and is preferably watertight to inhibit leaking. The potable water storage tank 12 can contain other fluids as well, depending on the intended use of the aircraft. As one example, non-potable water could instead be stored in the tank 12. The potable water storage tank 12 can supply potable water to a plurality of other facilities aboard the aircraft 1. In one embodiment, the potable water storage tank 12 can supply potable water to a lavatory 14 or a galley 16. In the illustrated embodiment, two lavatories 14, one fore and one aft, are depicted. Similarly, two galleys 16, fore and aft, are illustrated. In other embodiments, more or fewer lavatories and/or galleys can be present on the aircraft. In some embodiments, where aircraft have multiple levels, the lavatories and/or galleys can be on different or the same levels.

Each lavatory 14 can contain a lavatory basin 40. In some embodiments, the lavatory basin 40 can be a wash basin and can receive hot and/or cold water. In some embodiments, the lavatory basin 40 can receive potable water, and in other embodiments, non-potable water. In some embodiments, the basin can be a toilet basin. In certain embodiments, multiple basins can be used and connected in a manner similar to that described here for a single basin. The aircraft can have a conduit architecture for distributing potable water and other fluids from one location to another. The conduit architecture can have many different combinations and permutations of connections. Although one such architecture is described below, other architectures can be used as suitable for any aircraft. In the illustrated embodiment, a potable water supply conduit 18 can provide water from the potable water storage tank 12 to the lavatory basin 40. In other embodiments, where non-potable water is provided, other conduits, pipes, or lines can be used to supply the water. The potable water supply conduit 18 can have one or more branches, and supply potable water to more than one outlet. As shown in the illustrated embodiment, the potable water supply conduit 18 can connect to a lavatory basin subconduit 20. The lavatory basin subconduit 20 can further connect to the lavatory basin 40. In some embodiments, the potable water can first enter a water heater to provide heated water to the lavatory basin 40.

The lavatory 14 can also contain a toilet 42. The toilet 42 can receive water from the potable water supply conduit 18. As shown, the toilet 42 can optionally also receive fluid from another fluid reservoir 44. A toilet subconduit 21 can supply water to the toilet 42 from the potable water supply conduit 18. In those embodiments where a separate fluid reservoir 44 is used, a fluid reservoir conduit 46 can be used to supply fluid to the toilet 42. The fluid reservoir can contain potable water, non-potable water, cleaning fluid, or any other fluid suitable for use in lavatory toilets. As shown, the toilet subconduit 21 and the fluid reservoir conduit 46 can deliver a confluence of water and fluid, or independently deliver fluid to the toilet 42.

The galley 16 can have at least one galley basin 60. In some embodiments, multiple galley basins 60 can be present in each galley 16. A galley basin 60 can be a sink suitable for use in food and/or beverage preparation and disposal. In embodiments with multiple galleys, one or more galley basins 60 can typically be disposed in each galley 16. The galley basin 60 is preferably supplied water from the potable water storage tank 12. The potable water supply conduit 18 can supply a galley subconduit 62. The galley subconduit 62 preferably supplies potable water to the galley basin 60. In some embodiments, non-potable water from another fluid reservoir, similar to the lavatory reservoir, can also be used. In some embodiments, multiple subconduits can be used to supply the galley with potable or non-potable water at different locations than the galley basin 60, including without limitation, water dispensers, coffee machines, hot or cold water faucets, and the like. In some embodiments, a water heater can be used to heat water before delivery to the galley 16.

Waste from the lavatory basin 40 and/or toilet 42 and/or galley basin 60 can be drained to a waste tank 22. The waste tank 22 is preferably watertight, and can receive a volume of waste or waste fluids, sufficient to accommodate the aircraft 1 during operation. The waste tank 22 can receive any of a variety of substances, including waste of various types appropriate to the lavatory and galley, such as potable or non-potable water, waste water, human waste, food and/or beverage remnants, cleaning or disinfecting fluids, or other liquids or waste liquids. The waste tank 22 can be connected to the lavatory 14 and/or galley 16 through the use of waste lines 24. Waste lines 24 can run from each waste source directly, independently to the waste tank 22, or can merge or route waste as appropriate to create efficient fluid flow.

The waste tank 22 can retain the waste for later removal directly from the tank or, preferably, supply waste through a waste supply conduit 26 to a waste processing device 28. Additionally, in some embodiments, a water supply conduit 30 can be used to supply water directly from the potable water storage tank 12 or other water storage device directly to the waste processing device 28. Preferably, the waste processing device 28 can accept waste directly from the present waste tanks 22 and process it for injection into a jet engine.

The waste processing device 28 can process the waste by adjusting the physical properties of the waste through any suitable method, such as introduction of sterilizing or de-clumping chemicals, solvents, or additives, filtration, grinding, mashing, mixing, centrifuging, or blending. If a certain consistency is preferred, water from the potable water storage tank 12 can be introduced directly to the waste processing device 28. The waste processing device 28 can process its contents to a uniform or substantially uniform fluid. Preferably, the processed fluid has a smooth consistency, and any large waste particles have been ground or otherwise altered by the waste processing device 28 to create finer particles which may be of appropriate size to flow with the fluid waste into the jet engine 38. As described above, the potable water storage tank 12 can optionally provide water through the water supply conduit 30 as needed for processing, such as to dilute any solid particles or to thin the consistency of the waste fluid. Additionally, a control system can actuate the necessary functions of the waste processing device 28 as needed for operation.

As described, condensed water can be removed from the fuel tank 32 by one or more scavenge pumps 33. The water can flow through a scavenge pump flow conduit 34 directly to the waste processing device 28. In other embodiments, the scavenge pump flow conduit 34 can deliver the water to the waste tank 22, or the waste supply conduit 26, as appropriate for efficient fluid flow. The waste processing device 28 can accept fluid from the scavenge pump flow conduit 34 as part of waste processing. After processing in the waste processing device 28, the waste can be used as waste fuel. When introduced to the jet engine 38, the waste fuel can increase thrust as described below.

A control system 102 can regulate flow into the waste processing device 28 through any of the conduits supplying the waste processing device 28 with water, waste, or other fluids. In some embodiments, the potable water storage tank 12 can be substantially emptied prior to landing to reduce landing weight. Similarly, other tanks, such as the waste tanks 22 and water sumps in the fuel tanks can be substantially emptied prior to landing. As a result, the aircraft 1 will have a decreased weight and correspondingly lower stall speed.

The aircraft 1 can have one or more jet engines 38. Each jet engine 38 can be of an appropriate type to sustain aircraft flight. Each jet engine can have multiple compression stages 80a, 80b, 80c, with a final compression stage, or compression chamber, 80a. Each compression stage can be a separate compression chamber, with multiple entry and exit ports. Air and fuel can be mixed and compressed through successive compression stages 80a, 80b, 80c. A combustion portion 82 of the jet engine 38 can combust the compressed fuel/air mixture. Following combustion, exhaust in the form of heated gases and uncombusted fuel can exit through turbines 84a, 84b, 84c. The turbines 84a, 84b, 84c can be driven by the expanding heated gases comprising the exhaust. As a result, various power mechanisms can harness the work done on the turbines to produce power. After exiting the turbines, the exhaust can continue to expand, and provide thrust by exerting a force against the internal surfaces of the jet engine.

A waste fuel conduit 36 can supply processed waste fuel from the waste processing device 28 to the jet engine 38. The waste fuel conduit 36 can run to one or multiple jet engines, as appropriate to the aircraft type and engine number. A control device 102 can be used to regulate flow of the waste fuel. The waste fuel can pass from the waste fuel conduit 36 to one or more waste fuel supply lines 100. The waste fuel supply lines 100 can provide the waste fuel to any appropriate stage of the jet engine 38. As an example, waste fuel can be provided to the final compression stage 80a of the jet engine 38. In other embodiments, waste fuel can be provided to other stages 80b, 80c, any of the turbine chambers 84a, 84b, 84c, the combustion chamber 82, or any combination thereof. Waste fuel can be provided by any appropriate method, including direct injection or after prior mixing with air and/or other mixing elements.

Injection of the waste/water fluid mixture to various stages of the jet engine 38 can provide increased thrust. In some embodiments, different portions of the fluids described above are provided to different stages of the jet engine 38. In one non-limiting embodiment, the scavenge pumps 33 can provide water directly to the jet engine 38 without first passing through the waste processing device 28. Similarly, the potable water storage tank 12 can also be directly connected to the jet engine 38 as appropriate. Control systems can be implemented to regulate the flow of fluids to the jet engine 38. Additionally, different fluids can be provided directly to different stages of the jet engine 38. In one non-limiting example, scavenge pumps 33 can provide water with traces of fuel directly to a turbine 84a, 84b, 84c portion of the engine, wherein the trace fuel is combusted substantially simultaneous with water vaporization and expansion.

An occupant or pilot of the aircraft 1 can control operation of the various devices and fluid control systems through use of on-board instrumentation within the cockpit or other suitable location, including aircrew work stations. Alternatively (or additionally), certain aspects of the waste disposal system described here may be controlled, regulated, or monitored by automated or computer-implemented architectures. Moreover, some or all of the components of the waste disposal system 10 can be accessible from outside the aircraft 1 for cleaning, maintenance, or other service, such as filter replacement.

Figure 2:
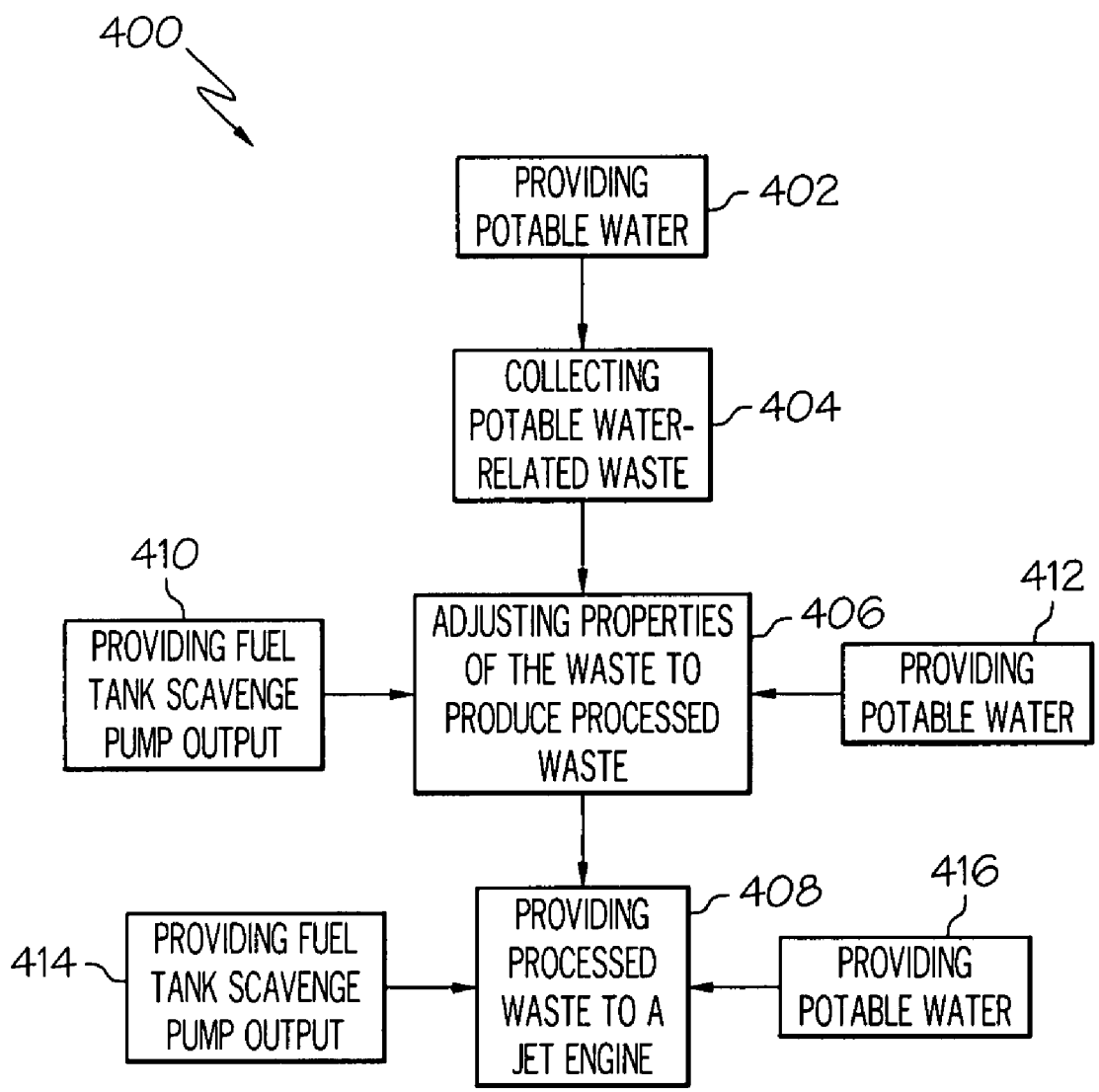
FIG. 2 is a schematic illustration of the steps of a process of operation of a waste disposal system.

FIG. 2 illustrates a sequence 400 of steps by which potable water, fuel tank scavenge pump output, and waste aboard an aircraft can be disposed of. In some embodiments, potable water is provided 402 to various facilities aboard an aircraft, including lavatories, galleys, and the like. Potable water-related waste, such as that from lavatories, galleys, and any other source can be collected 404. In one example, a storage tank can be used for waste collection. After collection, the properties of the waste can be adjusted 406. Some properties that can be adjusted include water content, granularity, viscosity, although other properties can be adjusted as well. In an optional step, the output from fuel tank scavenge pumps can be provided 410 to the waste during the adjusting 406. Similarly, potable water can optionally be provided 412 as well. As a result of adjustment 406, the waste can be processed to become processed waste. The processed waste can be provided 408 to a jet engine for use as a thrust enhancer. In optional steps, either or both of the output of fuel tank scavenge pumps and potable water can be provided 414, 416 to the jet engine as well.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A disposal system comprising:
    a first tank configured to be at least partially filled with a waste fluid;
    a waste processing device in fluid communication with the first tank, the waste water processing device configured to receive the waste fluid and adjust one or more properties of the waste fluid;
    a jet engine comprising a first chamber configured to contain a fluid undergoing compression, the jet engine in fluid communication with the waste processing device to receive the waste fluid from the waste processing device.

2. The disposal system of claim 1, wherein the first chamber comprises a compression chamber of the jet engine.

3. The disposal system of claim 2, wherein the first chamber comprises the final compression chamber of the jet engine.

4. The disposal system of claim 1, wherein the first chamber comprises a portion of a turbine in the jet engine.

5. The disposal system of claim 1, further comprising a second tank, the second tank at least partially filled with potable water and in fluid communication with the waste processing device.

6. The disposal system of claim 1, wherein the waste fluid comprises waste liquid from at least one of a galley, a lavatory, and a fuel tank scavenge pump.

7. The disposal system of claim 1, wherein the first tank is in fluid communication with a basin in a lavatory.

8. The disposal system of claim 1, wherein the first tank is in fluid communication with a basin in a galley.

9. The disposal system of claim 1, further comprising a fuel tank scavenge pump in fluid communication with at least one of the waste processing device and the jet engine.

10. The disposal system of claim 1, further comprising a control system adapted to adjust the flow of a fluid in a conduit.

* * * * *